June 28, 1938.  J. M. WOOD  2,121,897
POWER TAKE-OFF DEVICE FOR AUTOMOBILE TRUCKS AND TRACTORS
Filed May 11, 1936  2 Sheets-Sheet 1
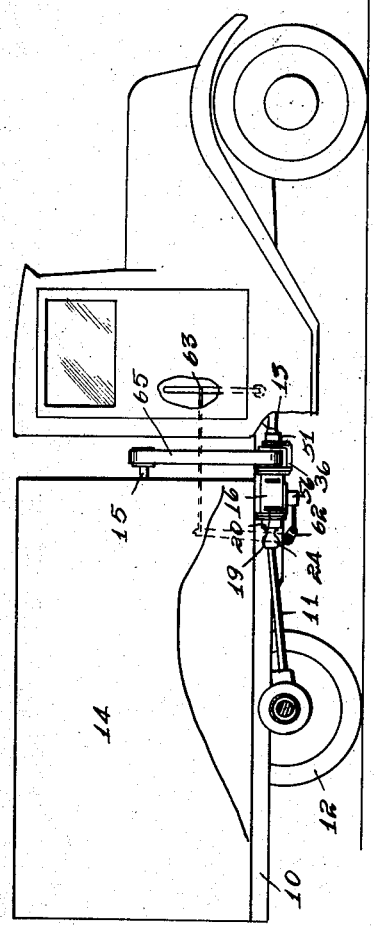
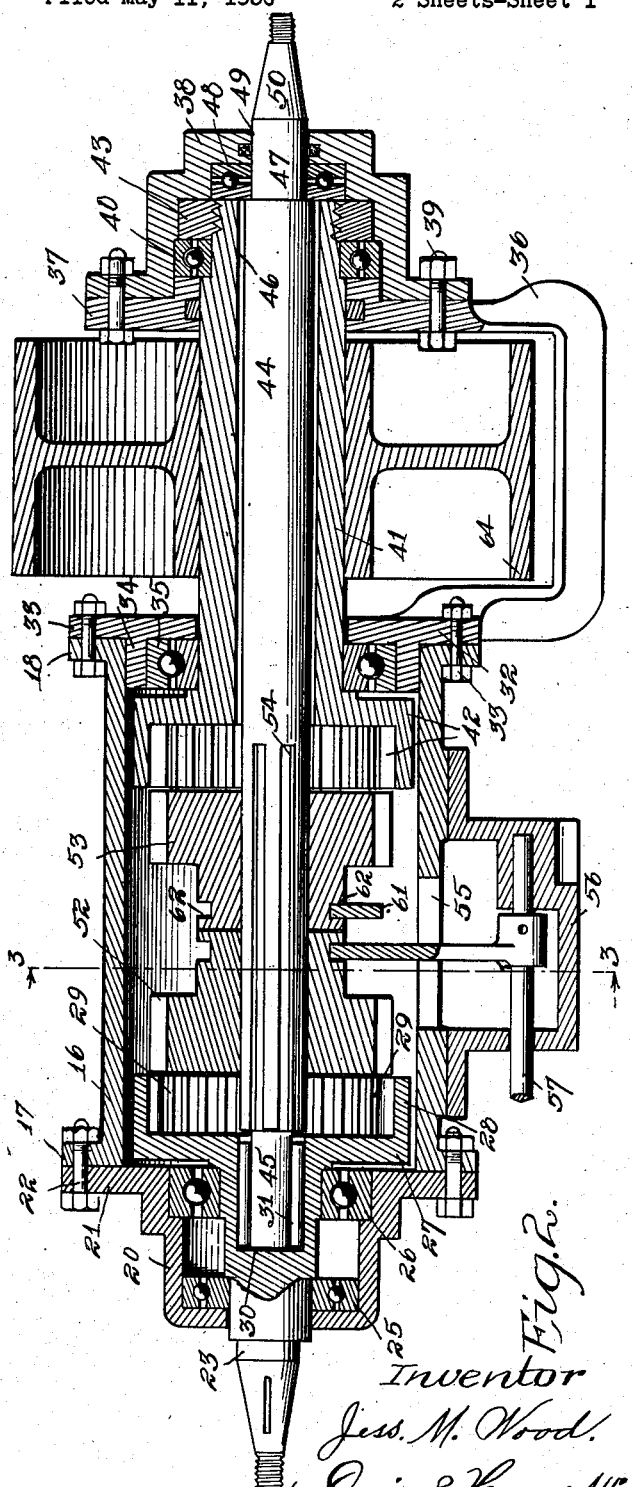
Inventor
Jess. M. Wood.
by Orwig & Hague Attys June 28, 1938.                J. M. WOOD                2,121,897
POWER TAKE-OFF DEVICE FOR AUTOMOBILE TRUCKS AND TRACTORS
Filed May 11, 1936        2 Sheets-Sheet 2
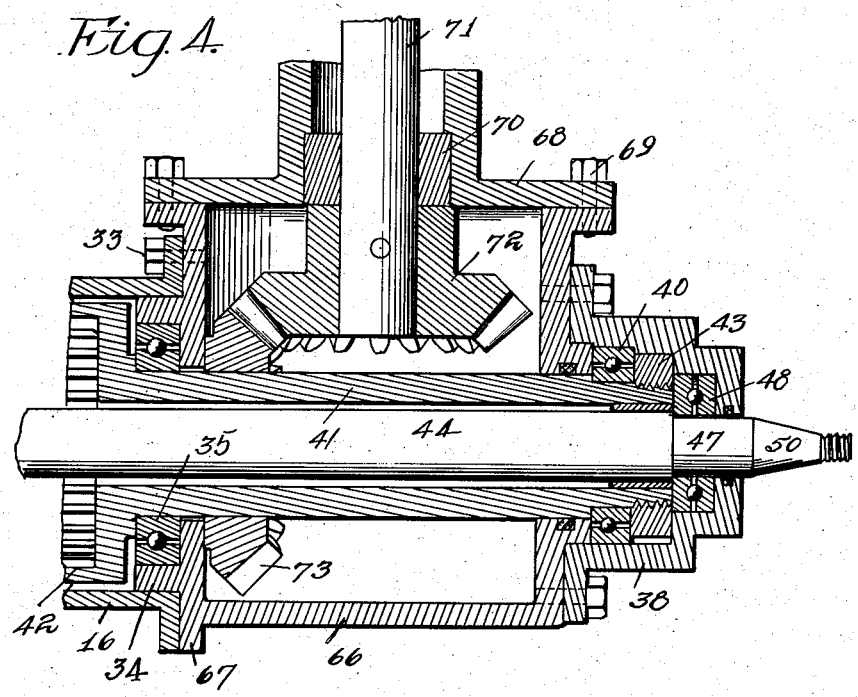
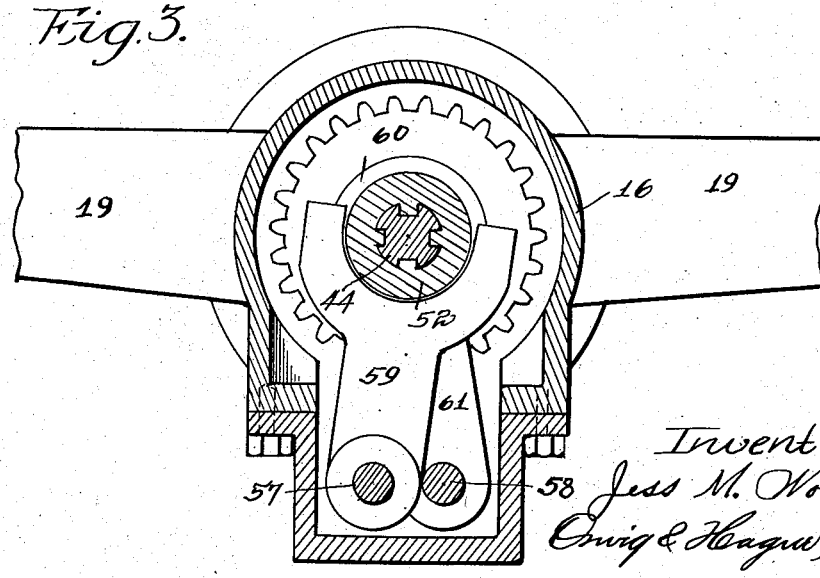
Inventor
Jess M. Wood
Orwig & Hague Attys Patented June 28, 1938

2,121,897

UNITED STATES PATENT OFFICE 2,121,897

POWER TAKE-OFF DEVICE FOR AUTOMOBILE TRUCKS AND TRACTORS

Jess M. Wood, Windom, Minn.

Application May 11, 1936, Serial No. 79,109

3 Claims. (Cl. 74—11)

My invention relates to a power take-off device of that type designed to be used in conjunction with an automobile truck or the like whereby power provided for operating the truck is also utilized for operating the power take-off device. This provides means whereby corn shellers, feed grinders, cement mixers or other devices may be carried by the truck frame and have their power derived from said take-off device.

I realize that a number of power take-off devices have been constructed and patented for this purpose but, so far as I am aware, most of these devices are complicated, expensive and difficult to mount, and when mounted are not very efficient in their operation. Most of these devices have their power take-off shafts extending outwardly from the clutch case and provided with a gear, or belt pulley carried by the outer end of the shaft for power purposes, so that lateral strains are imparted to the shaft, due to the tension of the belt or to the action of the driver gear against the driven gears when gears are utilized, the said power shaft being insufficiently supported to provide a rigid structure to insure against binding and twisting strains in the shaft bearing.

It is also desirable to include in the power take-off mechanism means whereby either a belt wheel or gear mechanism may be easily and quickly connected to the power take-off shaft so that the power take-off mechanism may be very easily and quickly adapted to operate various kinds of machinery. Therefore, the object of my invention is to provide a power take off unit of the type above described, of simple, durable and inexpensive construction, which may be easily and quickly placed in operative position on an automobile truck, and to provide means whereby either a belt wheel or gear driven power shaft may be easily and quickly connected to the main power take-off device without altering the construction.

More specifically, it is the object of my invention to provide in a power take off device of the type above described, a main clutch case which may be rigidly connected to the frame of the truck, and in connection therewith a detachable element, or elements, at one end of the clutch case whereby either a belt wheel or power shaft gear mechanism may be easily and quickly attached thereto.

A further object is to provide in a power take-off device of the type above described, improved clutch mechanism.

A further object is to provide in a power take-off mechanism improved means for supporting the power take-off shaft wherein each end of the shaft is supported by a suitable bearing with the power take-off device secured to the shaft at a point between the bearings.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of a truck, a portion of which is in longitudinal vertical section to show the manner in which my improved take-off device is attached thereto.

Figure 2 is a longitudinal sectional view of the power unit.

Figure 3 is a detail transverse sectional view taken on the line 3—3 of Figure 2.

Figure 4 is a horizontal sectional view of a modified form of my device.

In the drawings I have used the reference numeral 10 to indicate the frame of an automobile truck, and 11 the drive shaft for operating the rear wheels 12. The numeral 13 indicates what I shall term the engine driven shaft which, as a matter of fact, is the power shaft of the transmission gear operated from the engine shaft, of ordinary construction. The numeral 14 indicates any mechanism carried by the automobile frame, such as a corn sheller, having a power shaft 15 for operating mechanism carried by the control 14.

My improved power take-off device comprises a clutch case 16 having both ends open and provided with a flange 17 at its rear end and a flange 18 at its front end. The case 16 is provided with bracket members 19 by means of which the case may be secured to the frame members 10, said case being mounted behind the transmission gear case of the automobile in alinement with the shaft 13. The rear end of the case 16 is provided with what I shall term a bearing housing 20, having a flange 21 adapted to engage the flange 17, said flanges being secured together by means of bolts 22. Rotatably mounted in the housing 20 is a driven shaft 23, having its rear end adapted to be connected to the shaft 11 by means of a suitable universal joint 24 of ordinary construction. The shaft 23 is mounted in ball bearings 25 and 26, the inner end of the shaft 23 being provided with a clutch member 27 having an annular flange 28 on its forward end, said flange carrying internal teeth 29. The forward end of the shaft 23 has a recess 30 for supporting a roller bearing 31.

The front end of the case 16 is provided with a plate 32 bolted to the flange 18 by bolts 33, said plate having an inwardly extending flange 34 adapted to fit the inner surface of the case 16 and also support the ball bearing 35. The plate 32 is provided with a bracket 36 terminating in a plate 37. Secured to the front face of the plate 37 is a bearing housing 38, by means of suitable bolts 39, the housing 38 being designed to carry a ball bearing 40.

Rotatably mounted in the ball bearings 35 and 40 is a power take-off sleeve 41 having its inner end provided with an internal clutch member 42 similar to the clutch member 28, the forward end of the sleeve 41 being provided with a screw-threaded nut 43 to support the sleeve against rearward movement.

Rotatably mounted in the sleeve 41 is a drive shaft 44 having its rear end provided with a contracted portion 45 adapted to operate in the roller or ball bearing 31, while its forward end 44 is provided with a contracted portion 47 extending through a bearing 48, a combined load and thrust bearing carried by the housing 38, and thrust opening 49 in said housing, the forward end of the shaft 44 having a portion 50 adapted to be connected to the shaft 13 by means of a suitable coupling device 51.

Slidably mounted on the shaft 44 is a pair of clutch members 52 and 53, each having external teeth adapted to co-operate with the internal shaft of the adjoining clutch members 28 and 42, said clutch members 52 and 53 being splined to the shaft 44 by means of suitable flutes 54 provided in the shaft 44.

The case 16 is provided with an opening 55 and also with a case 56 covering said opening, the case 56 slidingly supporting rods 57 and 58, the rod 57 having a yoke 59 designed to enter a slot 60 in the clutch member 52, whereby said clutch member may be moved into and out of operation with the clutch member 29 by simply moving the rod 57 rearwardly or forwardly. The rod 58 is also provided with a clutch operating yoke designed to operate in a groove 52 in the clutch member 53. By this arrangement it will be seen the clutch member 52 may be moved into operative relation with the clutch member 29, causing the shafts 44 and 23 to operate in unison, while the clutch member 53 may be moved into engagement with the clutch member 42 to operatively connect the power take-off sleeve 41 with the shaft 44, thus providing means whereby the auto truck may be advanced over the ground surface, and at the same time the power take-off sleeve 41 may be operated. By leaving the clutch member 53 in its open normal position the truck may be advanced without operating the power sleeve, or the clutch member 53 may be moved into engagement with the clutch member 42, causing the power sleeve to be operated without advancing the truck. The rods 57 and 58 may be operated by any suitable rock shaft mechanism 62 connected with a suitable lever 63 mounted within the cab of the truck or any other suitable position. Power may be taken from the sleeve 41 either by the belt wheel 64, as illustrated in Figure 2, or by means of gear mechanism as illustrated in Figure 4, the said belt wheel 64 being operatively connected with the shaft 15 by means of a belt 65.

When it is desired to employ gear mechanism such as illustrated in Fig. 4, the plate 32 and the bracket 36 are detached from the casing 16, the said plate 32 being detached by simply moving the bolts 33, after which the entire assembly may be removed from said casing and from the shaft 44 simply by sliding the sleeve 41 outwardly and longitudinally of said shaft. The assembly illustrated in Figure 4 may then be substituted, said assembly comprising a gear case 66 having a plate 67 similar to the plate 32 and secured to the flange 18 by means of the bolts 33.

The bearing housing 38 may be removed from the plate 37 and applied to the outer end of the gear casing 66. The sleeve 41 may also be applied to the gear casing, as clearly illustrated in Figure 4, the gear case 66 having one end open, said open end being provided with a plate 68 secured in position by means of bolts 69, said plate supporting a shaft bearing 70 in which is rotatably mounted a shaft 71. The inner end of the shaft 71 is provided with a beveled gear 72 designed to mesh with a beveled gear 73, keyed to the sleeve 41, thus providing means whereby the gear driven shaft 71 may be operated at right angles to the shaft 44 and thus provide means whereby the power take-off may be adapted to operate various types of mechanism without disturbing or dismounting the clutch case 16.

It will readily be seen that other types of gear driven power shafts may be substituted for the one illustrated in Figure 4 without involving any act of invention other than mechanical skill.

One of the advantages of my construction lies in the fact that the power sleeve 41 is mounted at each end in suitable bearings 35 and 40, the bearing 35 being carried by the clutch case 16, while the bearing 40 is carried by a suitable housing supported by the bracket 36, which in turn is fixed to the clutch case, so that both ends of the sleeve 41 are rigidly supported against lateral movement, as well as longitudinal movement, without imparting any lateral strain to the drive shaft 44, the rear end of said drive shaft being mounted in the bearing 31 carried by the forward end of the driven shaft 23 and in axial alinement therewith, thus providing means whereby the power sleeve and the drive shaft, as well as the clutch elements, are mounted in alinement whereby the clutch elements may be easily moved into and out of operative position and whereby the coacting gears are held in proper alinement to eliminate wear and loss in power as they are operated.

Furthermore, the device provides a unitary construction all the parts of which may be mounted and alined in the shop before being placed in the automobile frame, thereby eliminating any necessity of alining the bearing 40 with the bearings 26 and 35 at the time the clutch case and gear mechanism is being mounted in the auto frame.

I claim as my invention:

1. A clutch case, a bearing housing detachably secured to one end of said clutch case having inner and outer bearings, a driven shaft rotatably mounted in said bearings having its inner end provided with an inwardly extending clutch element and an axial bearing, a bracket detachably secured to the other end of said clutch casing, a bearing supported in the inner end of said bracket, a bearing housing detachably secured to the outer end of said bracket, a bearing in the second bearing housing, a sleeve extending through said bracket and rotatably mounted in the bearings carried thereby and in axial alinement with the first shaft, said sleeve having a clutch element on its inner end, a shaft mounted through said sleeve having its inner end rotatably mounted in the bearing on the first shaft, a second bearing in the second bearing housing rotatably supporting the outer end of the last shaft, a clutch element splined to said shaft to cooperate with the first clutch element, means for moving either of the last clutch elements in operative relation with the corresponding clutch element, and a power take-off element carried by said sleeve and between its supporting bearings.

2. A clutch casing, a bearing housing detachably secured to one end of said clutch casing, a driven shaft rotatably mounted in said housing having its inner end provided with an inwardly extending clutch element and an axial bearing, a bracket detachably secured to the other end of said clutch casing, a bearing supported at each end of said bracket and spaced apart, a sleeve rotatably mounted in said bearings having a clutch element on its inner end, a second bearing carried by the outer end of said bracket and in axial alinement with the driven shaft, a shaft supported in said sleeve having its inner end journaled in the inner end of the driven shaft and its outer end in said second bearing, a power take-off device carried by said sleeve and between its supporting bearings, and a clutch element splined to said shaft and between the first clutch elements and adapted to cooperate therewith whereby either one of the first clutch elements may be operatively connected with said second shaft.

3. A clutch casing, a detachable housing closing one end of said casing, a driven shaft rotatably mounted therein having a bearing element in its inner end, a detachable bracket member closing the other end of said casing, said bracket having a pair of spaced bearings, a sleeve rotatably mounted in said bearings, a belt pulley carried by said sleeve and between said bearings, a drive shaft rotatably mounted in said sleeve having its inner end rotatably mounted in the inner end of the driven shaft, a bearing carried by said bracket supporting the opposite end of said drive shaft, and clutching devices for operatively connecting said drive shaft with either the driven shaft or said sleeve.

JESS M. WOOD.